United States Patent
Nishimura

(10) Patent No.: US 10,908,615 B2
(45) Date of Patent: Feb. 2, 2021

(54) AUTONOMOUS MOBILE ROBOT, AND METHOD AND PROGRAM FOR CONTROLLING THE SAME

(71) Applicant: NEC Corporation, Minato-ku (JP)

(72) Inventor: Takahiro Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 15/897,234

(22) Filed: Feb. 15, 2018

(65) Prior Publication Data

US 2018/0259971 A1 Sep. 13, 2018

(30) Foreign Application Priority Data

Mar. 8, 2017 (JP) .................. 2017-043490

(51) Int. Cl.
*G05D 1/02* (2020.01)
*G06T 7/20* (2017.01)
(Continued)

(52) U.S. Cl.
CPC ............ *G05D 1/0246* (2013.01); *B25J 5/007* (2013.01); *B25J 9/162* (2013.01); *B25J 9/1666* (2013.01);
(Continued)

(58) Field of Classification Search
CPC .... H03H 9/08; H03H 9/02102; H03H 9/1021; H03H 9/19; H03H 9/0552
See application file for complete search history.

(56) References Cited

U.S. PATENT DOCUMENTS 8,368,766 B2 * 2/2013 Zhou .................... G06T 3/4038
348/208.14
8,793,069 B2 * 7/2014 Kuroda .................. G01S 17/66
701/519
(Continued)

FOREIGN PATENT DOCUMENTS

| JP | H05-297944 A | 11/1993 |
| JP | H08-166822 A | 6/1996 |
| JP | 2008-243217 A | 10/2008 |

OTHER PUBLICATIONS

Chinatsu Horii et al., "Tracking and Collision Avoidance of Mobile Robot with Vision," The Institute of Electronics, Information and Communication Engineers, Technical Report of IEICE, PRU95-25, May 1995, pp. 33-40.

*Primary Examiner* — Adam R Mott

(57) ABSTRACT

An autonomous mobile robot includes a target acquisition unit which acquires a target by using an image obtained by an imaging unit whose field of view is able to be changed, a target movement prediction unit which predicts the destination of the target by using the image of the target, an obstacle movement prediction unit which predicts the destination of an obstacle by using an image of the obstacle, an occlusion determination unit which determines whether or not the target is occluded by the obstacle from result of the prediction by the target movement prediction unit and result of the prediction by the obstacle movement prediction unit, and a target tracking unit which changes the field of view of the imaging unit so that the area of the target coming into the field of view increases in the case where it is determined that at least a part of the target is occluded by the obstacle.

18 Claims, 9 Drawing Sheets

(51) Int. Cl.
     *H04N 5/232*  (2006.01)
     *G05D 1/00*   (2006.01)
     *B25J 5/00*   (2006.01)
     *B25J 9/16*   (2006.01)

(52) U.S. Cl.
     CPC .......... *B25J 9/1697* (2013.01); *G05D 1/0088* (2013.01); *G05D 1/0214* (2013.01); *G06T 7/20* (2013.01); *H04N 5/232* (2013.01); *H04N 5/23219* (2013.01); *H04N 5/23238* (2013.01); *H04N 5/23296* (2013.01); *G05D 2201/0211* (2013.01); *G06T 2207/30241* (2013.01); *G06T 2207/30261* (2013.01); *Y10S 901/01* (2013.01); *Y10S 901/47* (2013.01)

(56) References Cited

U.S. PATENT DOCUMENTS

| | | |
|---|---|---|
| 2004/0073368 A1* | 4/2004 | Gonzalez-Banos .................... G05D 1/0274 701/301 |
| 2006/0199864 A1 | 9/2006 | Traynelis et al. |
| 2010/0235033 A1* | 9/2010 | Yamamoto ............. G05D 1/024 701/26 |

\* cited by examiner

AUTONOMOUS MOBILE ROBOT, AND METHOD AND PROGRAM FOR CONTROLLING THE SAME

This application claims priority from Japanese Patent Application No. 2017-043490 filed on Mar. 8, 2017. The entire teachings of the above application are incorporated herein by reference.

BACKGROUND OF THE INVENTION

1. Field of the Invention

The present invention relates to an autonomous mobile robot capable of approaching a target while avoiding an obstacle and to a method and program for controlling the autonomous mobile robot.

2. Description of the Related Art

Robots which move autonomously are being used in a variety of fields. It is desirable that a robot moves so as not to collide with a person or an object in order to ensure safety when autonomously moving. In an environment in which people and objects come and go, an obstacle that moves (moving obstacle) appears. In such an environment, preferably a robot is able to approach a target while avoiding the moving obstacle.

There is an idea that a robot is provided with an ultrasonic sensor, an infrared sensor, a laser radar, or the like so that the robot detects an obstacle by using the sensor to avoid the obstacle (for example, refer to Patent Literature (PTL) 1). Upon detecting an obstacle, the robot described in PTL 1 performs an operation of avoiding the obstacle. Moreover, there is also a robot that stops when detecting an obstacle and remains stopped until the obstacle deviates from the flow line of the robot. Specifically, the robot enters a deadlock state. Further, upon detecting that the obstacle deviates from the flow line, the robot starts to move again.

When the target of the robot is a non-moving object, if the robot falls into a situation of deadlock, serious problems do not happen. However, when the target is a moving object such as a person (hereinafter, referred to as "moving target"), the robot is likely to lose sight of the target if the robot falls into a situation of deadlock.

There is a robot that moves to a moving target while observing the moving target and a moving obstacle and controlling its own traveling direction (for example, refer to PTL 2). The robot described in PTL 2 periodically observes the position and the moving speed of the moving obstacle and those of the moving target. The robot then predicts a position after a predetermined period of time of the moving obstacle and that of the moving target on the basis of past observed data. The robot determines whether or not the robot collides with the moving obstacle on the basis of the result of the prediction. If it determines that the robot collides with the moving obstacle, the robot changes the traveling direction. Thereafter, the robot moves with a view to the moving target again.

Non Patent Literature (NPL) 1 describes a robot that predicts a future position of a moving obstacle and, if it is determined that a moving obstacle will be located on a predicted moving locus of the robot, corrects the trajectory so that the moving obstacle deviates from the field of view of the robot.

PTL 3 describes a robot having a face matching function.

PRIOR DISCLOSURES

Patent Literature

PTL 1: Japanese Patent Application Laid-Open No. Hei 8-166822

PTL 2: Japanese Patent Application Laid-Open No. Hei 5-297944

PTL 3: Japanese Patent Application Laid-Open No. 2008-243217

Non Patent Literature

NPL 1: Chinatsu Horii, et al., "Tracking and Collision Avoidance of Mobile Robot with Vision," Technical Report of IEICE, PRU95-25, May 1995, pp. 33-40

SUMMARY OF THE INVENTION

A robot incorporating a sensor to observe the positions of a moving obstacle and a moving target is able to avoid collision with a moving obstacle while approaching the moving target. In addition, even if the moving obstacle occludes the moving target in the case of avoiding collision with the moving obstacle, the robot is able to approach the moving target as long as the moving target is within the field of view of the robot when the operation of avoiding the collision is completed.

However, in case that the moving target disappears from view of the robot during the operation of avoiding collision, it is difficult for the robot to approach the moving target even if the moving obstacle does not occlude the moving target.

Therefore, it is an object of the present invention to provide an autonomous mobile robot capable of preventing the robot from losing sight of a target in the case of encountering an obstacle.

One exemplary embodiment of an autonomous mobile robot includes: a target acquisition unit which acquires a target by using an image obtained by an imaging unit whose field of view is able to be changed; a target movement prediction unit which predicts the destination of the target by using the image of the target; an obstacle movement prediction unit which predicts the destination of an obstacle by using an image of the obstacle; an occlusion determination unit which determines whether or not the target is occluded by the obstacle from result of the prediction by the target movement prediction unit and result of the prediction by the obstacle movement prediction unit; and a target tracking unit which changes the field of view of the imaging unit so that the area of the target coming into the field of view increases in the case where it is determined that at least a part of the target is occluded by the obstacle.

One exemplary embodiment of an autonomous mobile robot control method includes: acquiring a target of an autonomous mobile robot by using an image obtained by an imaging unit whose field of view is able to be changed; predicting the destination of the target by using the image of the target; predicting the destination of an obstacle by using an image of the obstacle; determining whether or not the target is occluded by the obstacle from result of the prediction of the destination of the target and result of the prediction of the destination of the obstacle; and changing the field of view of the imaging unit so that the area of the target coming into the field of view increases in the case where it is determined that at least a part of the target is occluded by the obstacle.

One exemplary embodiment of a non-transitory computer-readable recording medium, which stores an autonomous mobile robot control program, the autonomous mobile robot control program causing a processor to perform: acquiring a target of an autonomous mobile robot by using an image obtained by an imaging unit whose field of view is able to be changed; predicting the destination of the target by using the image of the target; predicting the destination of an obstacle by using an image of the obstacle; determining whether or not the target is occluded by the obstacle from result of the prediction of the destination of the target and result of the prediction of the destination of the obstacle; and changing the field of view of the imaging unit so that the area of the target coming into the field of view increases in the case where it is determined that at least a part of the target is occluded by the obstacle.

One exemplary embodiment of the autonomous mobile robot is able to prevent the robot from losing sight of a target in the case of encountering an obstacle.

DESCRIPTION OF THE PREFERRED EMBODIMENTS

Exemplary Embodiment 1

Hereinafter, the exemplary embodiments of the present invention will be described with reference to appended drawings.

Figure 1:
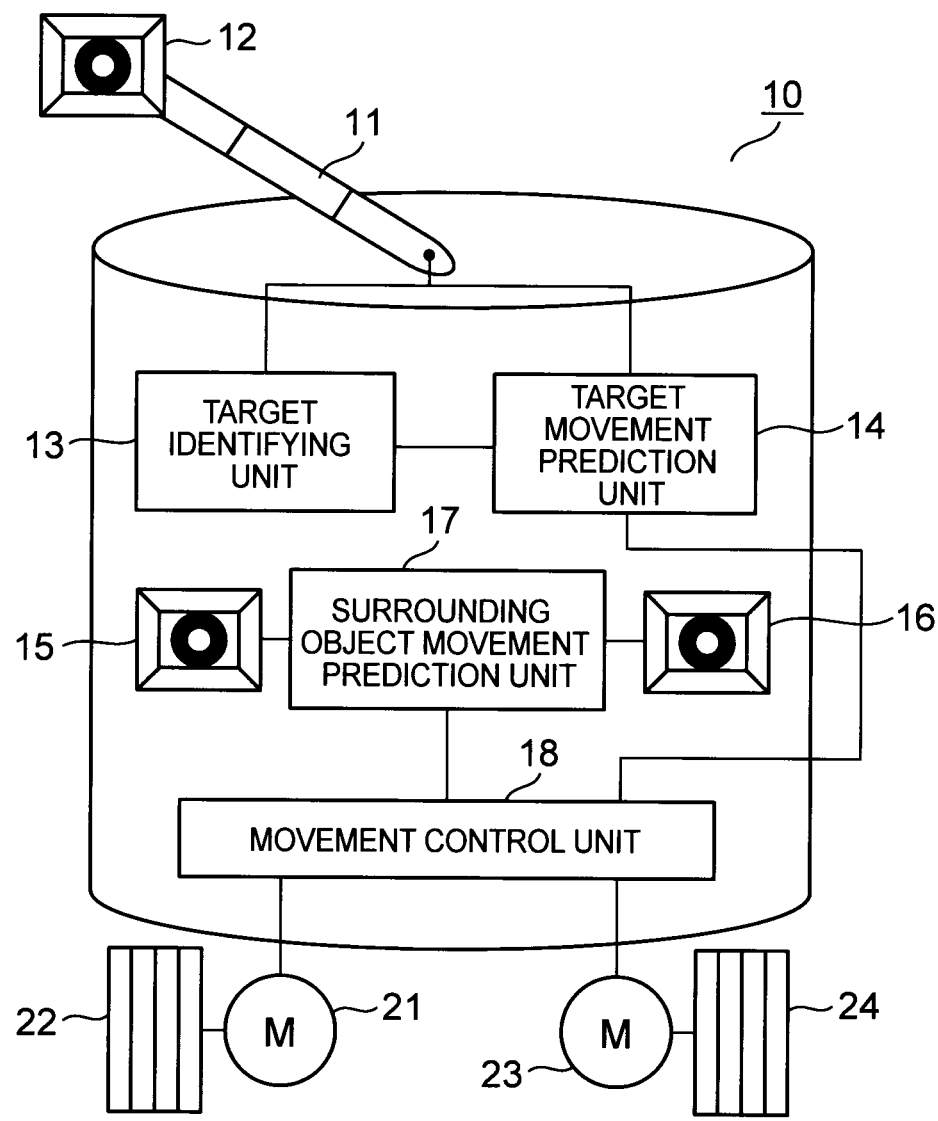
FIG. 1 It depicts a block diagram illustrating a first exemplary embodiment of an autonomous mobile robot according to the present invention.

FIG. 1 is a block diagram illustrating a first exemplary embodiment of an autonomous mobile robot (hereinafter, referred to as "robot") according to the present invention. A robot 10 illustrated in FIG. 1 includes a camera (a target detection camera) 12 attached to the tip of an arm 11, a target identifying unit 13, a target movement prediction unit 14, omnidirectional cameras 15 and 16 having a wider field of view than that of the camera 12, a surrounding object movement prediction unit 17, a movement control unit 18, motors 21 and 23, and moving objects 22 and 24. The moving objects 22 and 24 are, for example, endless tracks such as Caterpillar® or tires.

Although FIG. 1 illustrates the omnidirectional cameras 15 and 16 that cover all directions (the range of 360 degrees) by the two cameras, an omnidirectional camera capable of covering all directions only by one camera.

The arm 11 is driven by a drive unit (not illustrated) and extensible in the longitudinal direction. The camera 12 is driven so as to be rotated by the drive unit (not illustrated) at the tip of the arm 11.

The target identifying unit 13 identifies a target which the robot 10 is to move toward from the image obtained by the camera 12. Specifically, the target identifying unit 13 acquires a target of the robot 10. In this exemplary embodiment, the target of the robot 10 is assumed to be a person likely to move.

The target movement prediction unit 14 predicts a future position of the target (the position of the target located after the elapse of a certain period of time from the current time). The target movement prediction unit 14 estimates to what extent the predicted position protrudes from the screen if it protrudes from the screen.

The surrounding object movement prediction unit 17 predicts the future position of the target and the future positions of one or more obstacles on the basis of the image obtained by the omnidirectional cameras 15 and 16. Moreover, the surrounding object movement prediction unit 17 compares the position of an object on the screen of the omnidirectional cameras 15 and 16 with the position of the object on the image obtained by the camera 12 and, if detecting a position deviation, performs correction on the position on the screen of the omnidirectional cameras 15 and 16 or on the image of the camera 12. Note that surrounding objects include both of a target and an obstacle.

Furthermore, although the omnidirectional cameras 15 and 16 are used to predict the position of a target and the future position of an obstacle, an omnidirectional camera for predicting the position of a target may be separately provided from an omnidirectional camera for predicting the position of an obstacle.

The movement control unit 18 drives the motors 21 and 23 in order to move the moving objects 22 and 24. Moreover, the movement control unit 18 determines whether or not a target (specifically, the face of a person) is occluded by an obstacle, in other words, whether or not the target is hidden behind the obstacle, after the elapse of a certain period of time on the basis of result of the prediction by the target movement prediction unit 14 and result of the prediction by the surrounding object movement prediction unit 17.

If it is determined that the target is not occluded by the obstacle after the elapse of a certain period of time, the robot 10 advances toward the future position of the target.

If it is determined that the target is occluded by the obstacle after the elapse of a certain period of time, the movement control unit 18 performs processing for finding out measures to avoid the occlusion. Specifically, if determining that the target is occluded by the obstacle after the elapse of a certain period of time, the movement control unit 18 determines whether or not the target is maintained within the field of view of the camera 12 by moving the camera 12. Furthermore, if determining that the target is occluded by the obstacle after the elapse of a certain period of time, the movement control unit 18 determines whether or not there is a path along which the target is able to be acquired continuously on the basis of the motion vector of the target and the size and traveling distance of the obstacle. Moreover, if determining that the target is occluded by the obstacle after the elapse of a certain period of time, the movement control unit 18 determines whether or not the robot 10 should stand by on the basis of the motion vector of the target and the size and traveling distance of the obstacle.

Furthermore, in the case of a failure in finding measures to avoid occlusion, the robot 10 moves toward the future position of the target while avoiding an obstacle until the target is actually occluded by the obstacle.

The control after the target is actually occluded by the obstacle will be described in a second exemplary embodiment.

A part excluding an interface unit that inputs image data from the camera 12 in the target identifying unit 13, a part excluding an interface unit that inputs image data from the omnidirectional cameras 15 and 16 in the target movement prediction unit 14 and in the surrounding object movement prediction unit 17, and a part excluding a drive circuit that drives the motors 21 and 23 in the movement control unit 18 are able to be implemented by the central processing unit (CPU) that performs processing according to a program stored in a storage unit such as a read only memory (ROM) or the like.

Subsequently, the operation of the robot 10 will be described with reference to FIGS. 2 to 5.

Figure 2:
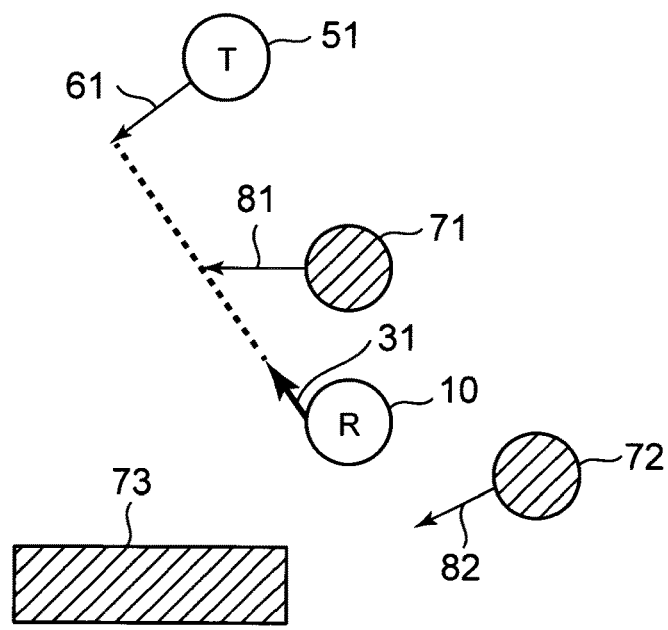
FIG. 2 It depicts an explanatory diagram illustrating an example of the locus of the robot.

FIG. 2 is an explanatory diagram illustrating an example of the locus of the robot 10. In the example illustrated in FIG. 2, a target 51 is predicted to move in the direction indicated by an arrow 61. In addition, it is assumed that obstacles 71, 72, and 73 are present. The obstacles 71 and 72 are assumed to be moving obstacles. The obstacles 71 and 72 are predicted to move in the directions indicated by arrows 81 and 82, respectively. In FIG. 2, a candidate route 31 along which the robot 10 moves is also illustrated.

Figure 3:
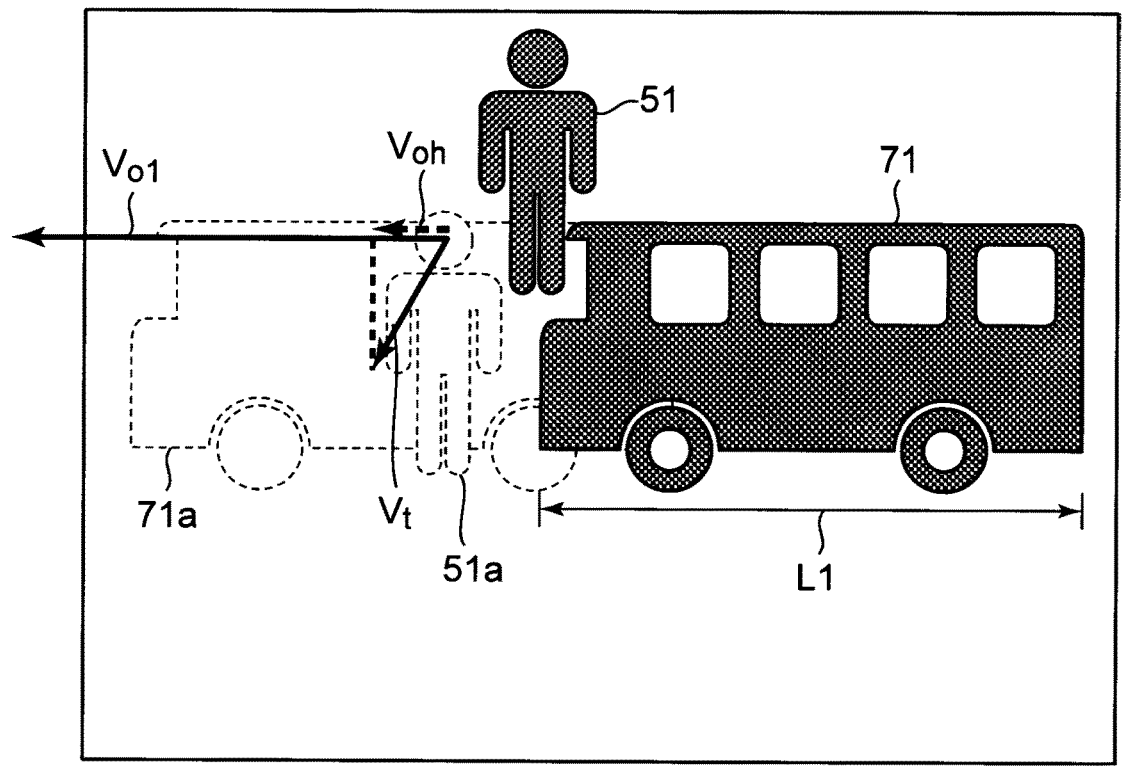
FIG. 3 It depicts an explanatory diagram illustrating an example of an image obtained by a camera.

FIG. 3 is an explanatory diagram illustrating an example of an image obtained by the camera 12. In this exemplary embodiment, the target movement prediction unit 14 of the robot 10 predicts the position of the target 51 after one second from that point on every time one second passes. The surrounding object movement prediction unit 17 predicts the positions of the obstacles 71 and 72 after one second from that point on every time one second passes. Note that one second is merely an example and any other period of time may be used.

In the example illustrated in FIG. 3, the target 51 and the obstacle 71 are within the field of view of the camera 12. The predicted positions after an elapse of one second of the target 51 and the obstacle 71 are indicated by dashed lines. In the example illustrated in FIG. 3, the target 51*a* and the obstacle 71*a* in the predicted positions after an elapse of one second overlap each other. Therefore, the camera 12 is not able to acquire the target 51*a*.

FIG. 3 also illustrates a motion vector $V_t$ of the target 51, a motion vector $V_{o1}$ of the obstacle 71, and an orthogonal projection vector $V_{oh}$, which is a vector obtained by orthographically projecting the motion vector $V_t$ onto the motion vector $V_{o1}$.

FIG. 3 illustrates that the obstacle 71 disappears from view of the camera 12 in one second. It means that the camera 12 is predicted not to be able to acquire the obstacle 71 in one second.

In the example illustrated in FIG. 3, the target 51 is occluded by the obstacle 71 in one second, while the obstacle 71 is within the field of view of the camera 12. However, if the target 51 is predicted to disappear from view of the camera 12 after one second, the robot 10 is required to perform an operation of moving or of changing the orientation of the camera 12 in order to acquire the target 51.

Figure 4:
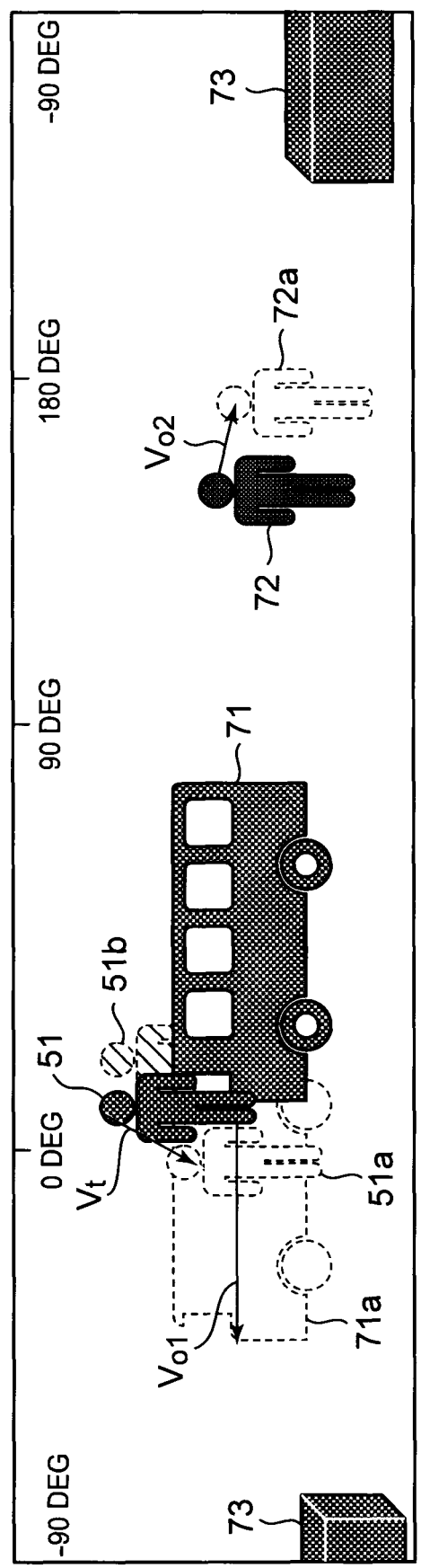
FIG. 4 It depicts an explanatory diagram illustrating an example of an image obtained by omnidirectional cameras.

FIG. 4 is an explanatory diagram illustrating an example of an image obtained by the omnidirectional cameras 15 and 16. In the example illustrated in FIG. 4, the target 51 and the obstacle 71 are within the screen of the omnidirectional cameras 15 and 16. The predicted positions in one second of the target 51 and the obstacle 71 are indicated by dashed lines. Moreover, an obstacle 72 is within the screen of the omnidirectional cameras 15 and 16. The predicted position in one second of the obstacle 72 is indicated by a dashed line. Due to a motion vector $V_{o2}$ of an obstacle 72*a* moving toward the predicted position in one second, the obstacle 72*a* does not overlap with the target 51*a*. In addition, an obstacle 73 is also present within the screen of the omnidirectional cameras 15 and 16.

FIG. 4 also illustrates target mapping 51*b* based on the image of the camera 12. The target mapping 51*b* is an image in which the target 51 in the image of the camera 12 is reflected in the position within the screen (within the screen of the omnidirectional cameras 15 and 16) corresponding to the position in the image.

The target mapping 51*b* is used to correct a positional deviation between the image of the camera 12 and the screen of the omnidirectional cameras 15 and 16. Preferably, the screen of the omnidirectional cameras 15 and 16 is reflected on the image of the camera 12 in consideration of the likelihood that an obstacle or the like currently not present in the image of the camera 12 appears in the image in one second. Since the reflection is not executed accurately if a positional deviation occurs, it is required that the positional deviation is eliminated.

Figure 5:
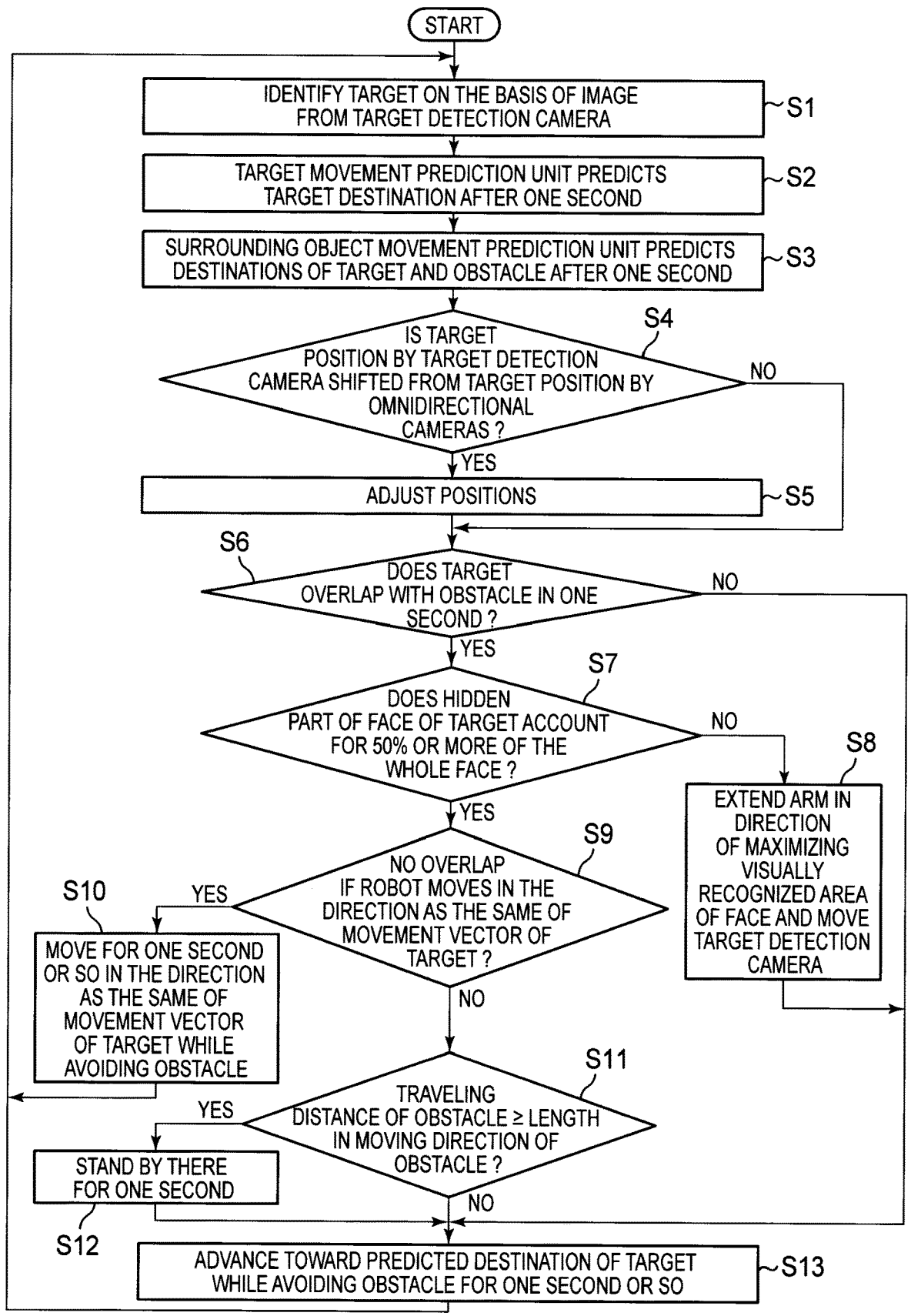
FIG. 5 It depicts a flowchart illustrating a target identification operation and an obstacle avoidance operation of the robot according to the first exemplary embodiment.

FIG. 5 is a flowchart illustrating a target identification operation and an obstacle avoidance operation of the robot 10.

A face image of the target 51 is previously registered in the target identifying unit 13. The target identifying unit 13 detects facial feature points to obtain the facial feature point locations of the eyes, the nose, the ends of the mouth, or the like. The target identifying unit 13 normalizes the size of the face or the like by using the feature point locations. The target identifying unit 13 then stores data of the features of the face image of the target 51.

As illustrated in FIG. 5, the target identifying unit 13 identifies the target 51 on the basis of the image from the camera 12 (step S1). For example, the target identifying unit 13 extracts a rectangular region that matches the face by searching for a rectangular region from the end area of the image sequentially. Thereby, the target identifying unit 13 detects a face by using the generalized learning vector quantization method based on the minimum classification error in order to identify whether or not the rectangular region is a face.

Next, the target identifying unit 13 searches for the locations of the feature points such as the pupil centers, the nasal wings, the ends of the mouth, and the like from the face rectangular region. Furthermore, after extracting various features such as the unevenness or inclination of the eyes and nose from the face, the target identifying unit 13 selects the optimal feature to identify an individual from these features. Thereafter, the target identifying unit 13 identifies the target 51 in the image obtained by the camera 12 by collating the features of each face with the stored features of the face image of the target 51.

Incidentally, "NeoFace"® in Japan provided by NEC Corporation may be used as a tool for implementing the above face matching.

Furthermore, when the process of step S1 is executed, the target identifying unit 13 instructs a drive unit for driving the camera 12 to rotate the camera 12 in the case of not being able to identify the target 51 within the screen.

After the target 51 is identified, the target movement prediction unit 14 predicts the destination after one second of the target 51, for example, on the basis of the past position and moving speed of the target 51 (step S2).

Moreover, the surrounding object movement prediction unit 17 predicts the destinations after one second of the target 51 and the obstacles 71, 72, and 73 on the basis of the screen of the omnidirectional cameras 15 and 16 (step S3). The surrounding object movement prediction unit 17 predicts the destinations after one second of the target 51 and the obstacles 71, 72, and 73, for example, on the basis of the past positions and moving speeds thereof obtained from the past video image of the omnidirectional cameras 15 and 16.

The surrounding object movement prediction unit 17 compares the position of the object on the screen of the omnidirectional cameras 15 and 16 with the position of the object in the image of the camera 12 and, if detecting a positional deviation, performs correction of the position on the screen of the omnidirectional cameras 15 and 16 (steps S4 and S5). In the example illustrated in FIG. 4, the object is the target 51.

The movement control unit 18 determines whether or not the destination in one second of the target 51 overlaps with the destination in one second of the obstacles 71, 72, and 73 (step S6). In the example illustrated in FIG. 3, the target 51 overlaps with the obstacle 71. If it is determined that the overlap does not occur, it can be considered that the obstacles 71, 72, and 73 do not come into the field of view in the direction of the target 51 and therefore the robot 10 continues to advance. Specifically, the robot 10 moves for one second or so toward the predicted destination of the target 51 (step S13). The robot 10 performs a collision avoidance operation in the meantime in the case where the robot 10 is likely to collide with the obstacle 71, 72, or 73. The collision avoidance operation includes, for example, deceleration and trajectory correction.

In the example illustrated in FIG. 3, the obstacle 71 overlaps with the target 51. If the obstacle 71 is determined to overlap with the target 51, the movement control unit 18 determines whether or not the area of a predetermined ratio or more out of the whole face part of the target 51 is occluded by the obstacle 71 (step S7). While the predetermined ratio means a ratio at which the face is able to be identified as the target 51 if the target 51 moves to some degree (if the occluded area is smaller), the predetermined ratio is set to an appropriate value according to the performance of a face recognition function on the robot 10. In this specification, the predetermined ratio is assumed to be 50% as an example.

If the area of the face part occluded by the obstacle 71 is less than 50%, the target movement prediction unit 14 instructs the drive unit for driving the arm 11 and the drive unit for driving the camera 12 to move the arm 11 in the longitudinal direction and to rotate the camera 12, respectively, so that the area of the face part of the target 51 (the area of a part not occluded by the obstacle 71) that appears on the screen of the camera 12 is maximum. These drive units drive the arm 11 and the camera 12 according to the instructions (step S8). Thereafter, the processing of step S13 starts.

If the area of the face part occluded by the obstacle 71 is 50% or more, the movement control unit 18 calculates a motion vector $V_t$ of the target 51, a motion vector $V_{o1}$ of the obstacle 71, and an orthogonal projection vector $V_{oh}$. The target movement prediction unit 14 then refers to the orthogonal projection vector $V_{oh}$ and determines whether or not the robot 10 is able to avoid a collision with the obstacle 71 (the predicted destination of the robot 10 does not overlap with the predicted destination of the obstacle 71) if the robot 10 moves in the same direction as the direction indicated by the motion vector $V_t$ of the target 51 (step S9).

If it is determined that the predicted destination of the robot 10 does not overlap with the predicted destination of the obstacle 71, the robot 10 moves for one second or so in the same direction as the direction indicated by the motion vector $V_t$ of the target 51 while avoiding the obstacle 71 (step S10). Specifically, the movement control unit 18 drives the motors 21 and 23 so that the moving objects 22 and 24 move in the same direction as the direction indicated by the motion vector $V_t$ of the target 51. The robot 10 performs the collision avoidance operation in the meantime in the case where the robot 10 is likely to collide with the obstacle 71, 72, or 73. Additionally, the movement control unit 18 ignores the components in the reversed direction of the motion vector $V_t$ when performing the process of step S10. The processing then returns to step S1.

If it is determined that the predicted destination of the robot 10 differs from the predicted destination of the obstacle 71, the movement control unit 18 compares the traveling distance for one second of the obstacle 71 with the length $L_1$ in the moving direction of the obstacle 71 (step S11).

If the traveling distance is equal to or longer than the length $L_1$ in the moving direction of the obstacle 71, the robot 10 stands by there for one second (step S12). In other words, the robot 10 awaits the passing of the obstacle 71. Specifically, the movement control unit 18 stops the driving of the motors 21 and 23. Thereafter, the processing of step S13 starts.

If the traveling distance is less than the length $L_1$ in the moving direction of the obstacle 71, the processing shifts to step S13. Specifically, the robot 10 moves for one second or so toward the predicted destination of the target 51. The robot 10 performs the collision avoidance operation in the meantime in the case where the robot 10 is likely to collide with the obstacle 71, 72, or 73.

The following expression (1), which is a determining method in step S11, can also be represented by expression (2).

$$(\text{the traveling distance of the obstacle}) \geq (\text{the length in the moving direction of the obstacle}) \quad (1)$$

$$|\text{the motion vector of the obstacle} - \text{orthogonal projection vector}| \geq (\text{the length in the moving direction of the obstacle}) \quad (2)$$

If the target 51 is occluded by the obstacle 71 in one second, the motion vector in the subsequent one second cannot be predicted. Under these circumstances, the motion vector in the subsequent one second is assumed to be the same as the motion vector after the initial one second.

As described above, in this exemplary embodiment, the movement control unit 18 predicts the motion of the target 51 and the motions of the obstacles 71, 72, and 73 and performs the control of preventing the target 51 from being deviated from the field of view as much as possible (see Steps S7, S8, S10, or the like). This reduces the likelihood of losing sight of the target 51.

Second Exemplary Embodiment

Figure 6:
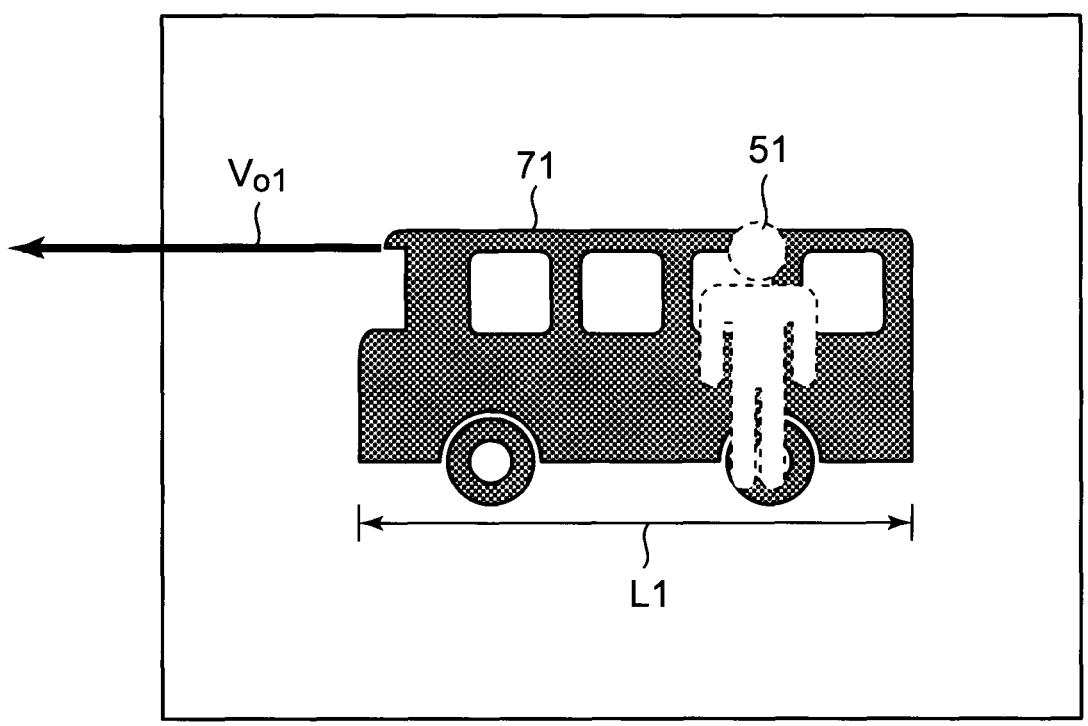
FIG. 6 It depicts an explanatory diagram illustrating an example of an image obtained by a camera in a second exemplary embodiment.

FIG. 6 is an explanatory diagram illustrating an example of an image obtained by the camera 12 in a second exemplary embodiment. In FIG. 6, there is illustrated a state where the target 51 is completely occluded by the obstacle 71. The configuration of the robot 10 in the second exemplary embodiment is the same as that of the first exemplary embodiment.

Figure 7:
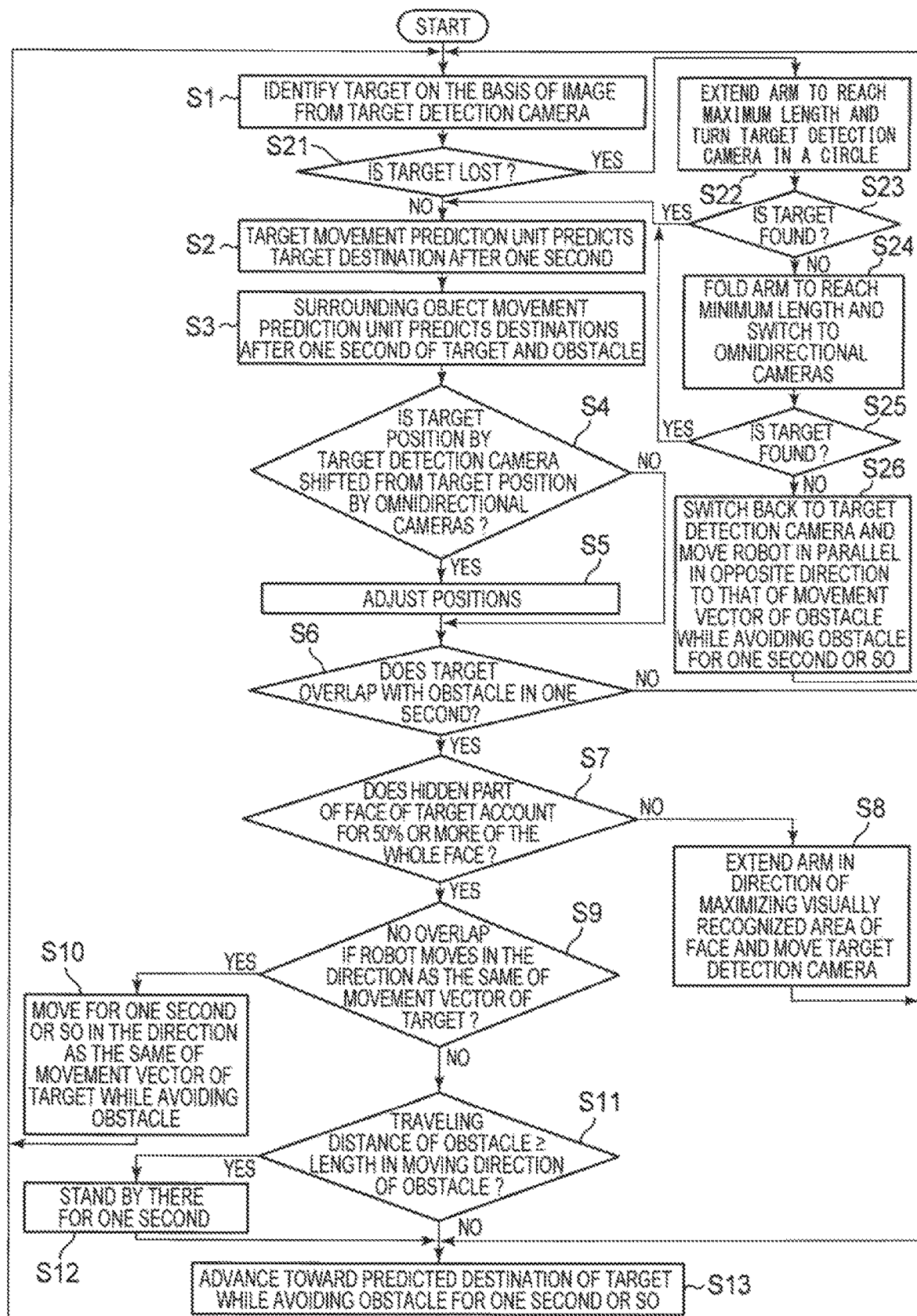
FIG. 7 It depicts a flowchart illustrating a target identification operation and an obstacle avoidance operation of a robot according to the second exemplary embodiment.

FIG. 7 is a flowchart illustrating a target identification operation and an obstacle avoidance operation of the robot 10 according to the second exemplary embodiment.

The target identifying unit 13 identifies the target 51 from an image obtained by the camera 12 as illustrated in FIG. 7 (step S1). In the case where the robot 10 loses sight of the target thereafter (step S21), the processes of steps S22 to S26 are performed. The processes of step S1 and steps S2 to S13 are the same as the processes thereof in the first exemplary embodiment.

The processes of steps S22 to 26 are intended for a case where the movement control unit 18 cannot find measures to avoid occlusion as described above and are effective as a control after the target 51 is actually occluded by the obstacle 71.

In step S22, the target identifying unit 13 instructs the drive unit for driving the arm 11 and the drive unit for driving the camera 12 to move the arm 11 so as to reach the maximum length in the longitudinal direction and to turn the camera 12 in a circular. Both of the drive units drive the arm 11 and the camera 12 according to the instructions.

When the arm 11 and the camera 12 have been driven, the target identifying unit 13 identifies the target 51 from the image obtained by the camera 12. If the target 51 is successfully identified, in other words, if the target 51 is successfully found (step S23), the processing returns to step S2. At this time, the target identifying unit 13 instructs the drive unit for driving the arm 11 to shorten the arm 11 as much as possible under the condition that the target 51 is present in the image.

In the case of not finding the target 51, the target identifying unit 13 attempts to find the target 51 by using the omnidirectional cameras 15 and 16, instead of using the camera 12. Specifically, the target identifying unit 13 instructs the drive unit for driving the arm 11 to shorten the arm 11 to the shortest length and performs processing of identifying the target 51 on the screen of the omnidirectional cameras 15 and 16 (step S24). The processing of identifying the target 51 is the same as the processing of step S1, though the intended image is different.

When the target 51 is successfully identified, in other words, when the target 51 is successfully found (step S25), the processing returns to step S2 to predict the destination from the target 51 on the screen of the omnidirectional cameras 15 and 16. At the same time, the target identifying unit 13 gives an operation instruction to the drive unit for driving the arm 11 and the drive unit for driving the camera 12 so that the found target 51 comes into the field of view, if possible.

Unless the target 51 is successfully found on the screen of the omnidirectional cameras 15 and 16, the target identifying unit 13 returns to a state in which the target 51 is to be found on the screen of the camera 12, the movement control unit 18 avoids the obstacles 71, 72, and 73 for one second or so while driving the motors 21 and 23 so that the robot 10 moves in the opposite direction to the motion vector $V_{o1}$ direction of the obstacle 71 (step S26). The processing then returns to step S1.

As described above, the target 51 is searched for by using the function of the camera 12, first, in the case where the target 51 is occluded by the obstacle 71 in the second exemplary embodiment. Unless the target 51 is found, the target 51 is searched for by using the omnidirectional cameras 15 and 16. Unless the target 51 is still found, the robot 10 moves in the reverse direction (in the opposite direction) to the moving direction of the obstacle 71 to attempt a search for the target 51.

Accordingly, in the second exemplary embodiment, such an advantageous effect is obtained as the target 51 is more likely to be found again in the case of losing sight of the target 51, in addition to the advantageous effect of the first exemplary embodiment such that the likelihood of losing sight of the target 51 decreases.

The robot 10 of each exemplary embodiment in the above is effectively applied to a use of approaching a particular person (a lost child, a VIP, or the like) or to an object including the particular person in a situation where many people and objects come and go in a theme park, a shopping mall, or the like, for example, but the use of the robot 10 according to the present invention is not limited thereto.

Figure 8:
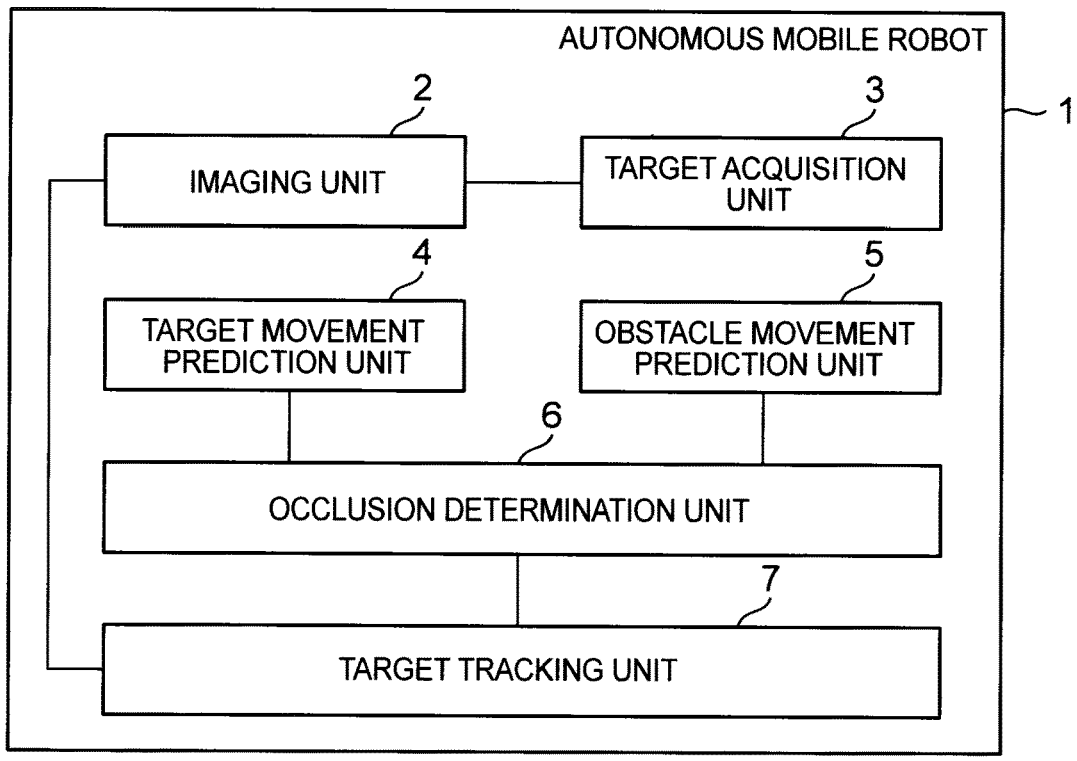
FIG. 8 It depicts a block diagram illustrating the main part of the autonomous mobile robot.

FIG. 8 is a block diagram illustrating the main part of the autonomous mobile robot. As illustrated in FIG. 8, the autonomous mobile robot 1 includes a target acquisition unit 3 (implemented by the target identifying unit 13 in the exemplary embodiment) that acquires a target by using an image obtained by an imaging unit 2 (for example, the camera 12) whose field of view is able to be changed; a target movement prediction unit 4 (implemented by the target movement prediction unit 14 in the exemplary embodiment) that predicts the destination of the target by using the image of the target; an obstacle movement prediction unit 5 (implemented by the surrounding object movement prediction unit 17 in the exemplary embodiment) that predicts the destination of the obstacle by using an image of the obstacle; an occlusion determination unit 6 (implemented by the movement control unit 18 in the exemplary embodiment) that determines whether or not the target is occluded by an obstacle from result of the prediction by the target movement prediction unit 4 and result of the prediction by the obstacle movement prediction unit 5; and a target tracking unit 7 (implemented by the target movement prediction unit 14 in the exemplary embodiment) that changes the field of view of the imaging unit 2 so that the area of the target coming into the field of view increases if it is determined that at least a part of the target is occluded by an obstacle.

Figure 9:
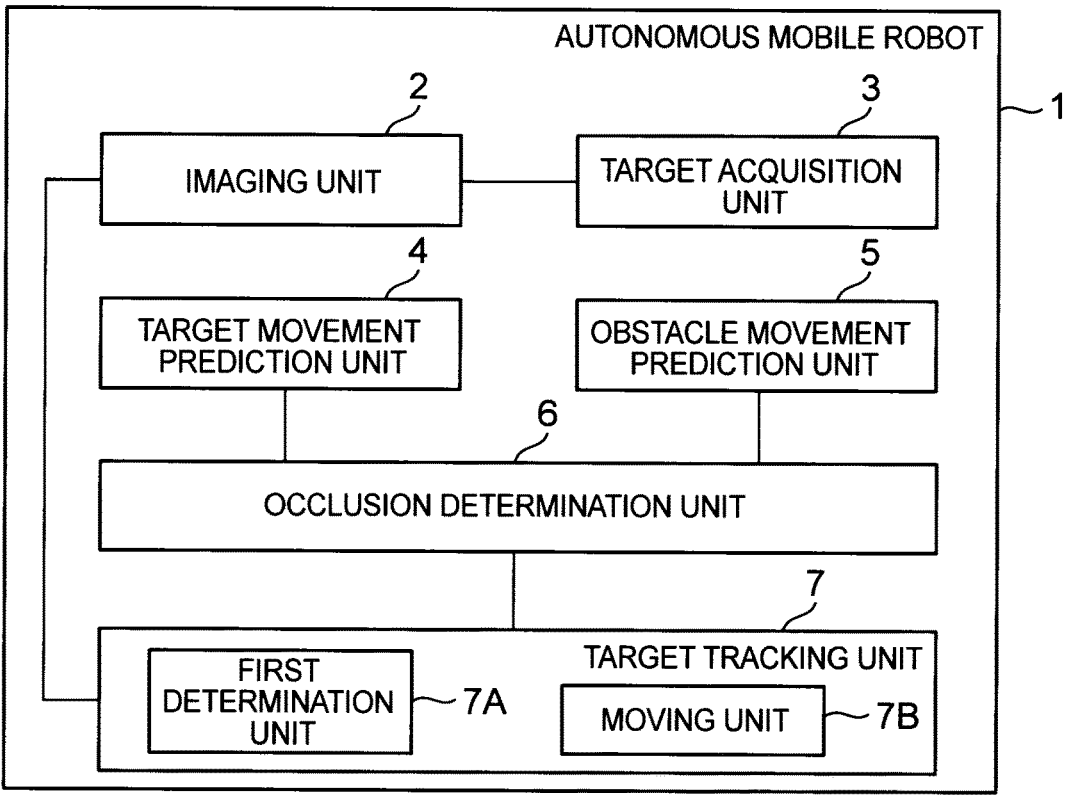
FIG. 9 It depicts a block diagram illustrating the main part of another autonomous mobile robot.

FIG. 9 is a block diagram illustrating the main part of an autonomous mobile robot of another mode. In the autonomous mobile robot 1 illustrated in FIG. 9, the target movement prediction unit 4 predicts the moving direction of the target. Moreover, the target tracking unit 7 is configured to include a first determination unit 7A that determines whether or not the likelihood that the target is occluded by the obstacle decreases when the autonomous mobile robot moves in the moving direction of the target and a moving unit 7B that moves the autonomous mobile robot in the moving direction of the target when the first determination unit 7A determines that the likelihood decreases.

Figure 10:
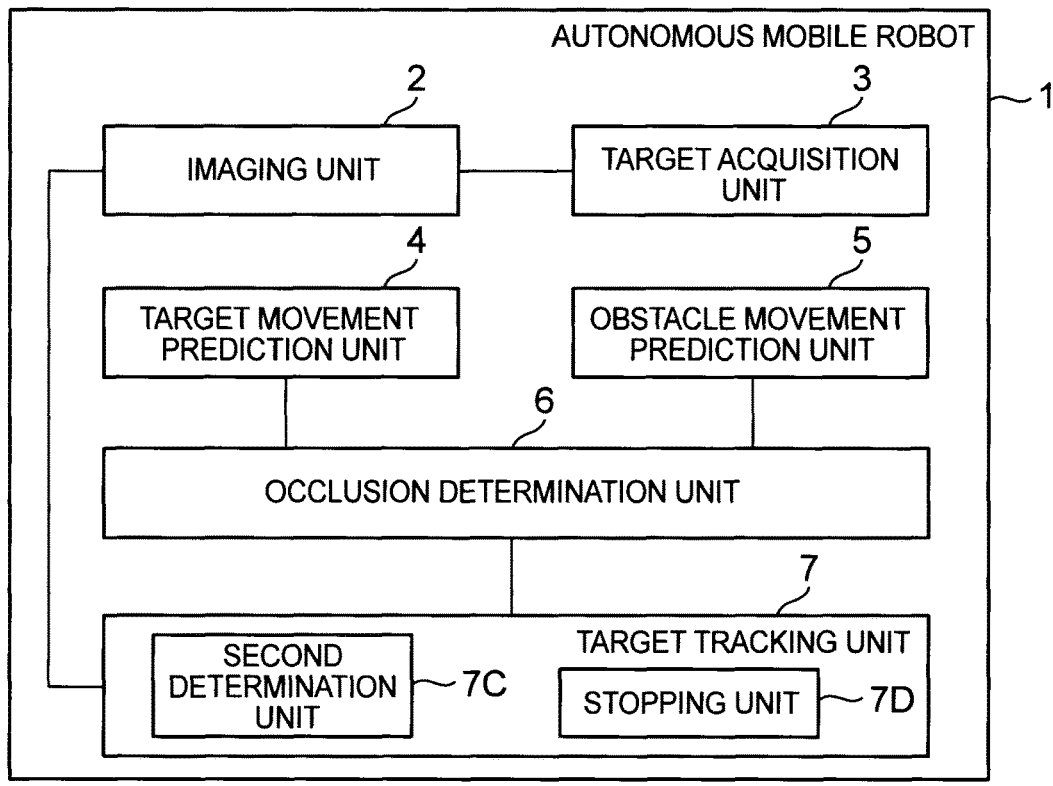
FIG. 10 It depicts a block diagram illustrating the main part of still another autonomous mobile robot.

FIG. 10 is a block diagram illustrating the main part of an autonomous mobile robot of still another mode. In the autonomous mobile robot 1 illustrated in FIG. 10, the obstacle movement prediction unit 5 predicts the moving direction of the obstacle. Furthermore, the target tracking unit 7 is configured to include a second determination unit 7C that determines whether or not the occlusion of the target by the obstacle is avoided when the obstacle moves in the moving direction of the obstacle and a stopping unit 7D that stops the autonomous mobile robot when the second determination unit 7C determines that the occlusion of the target is avoided.

Figure 11:
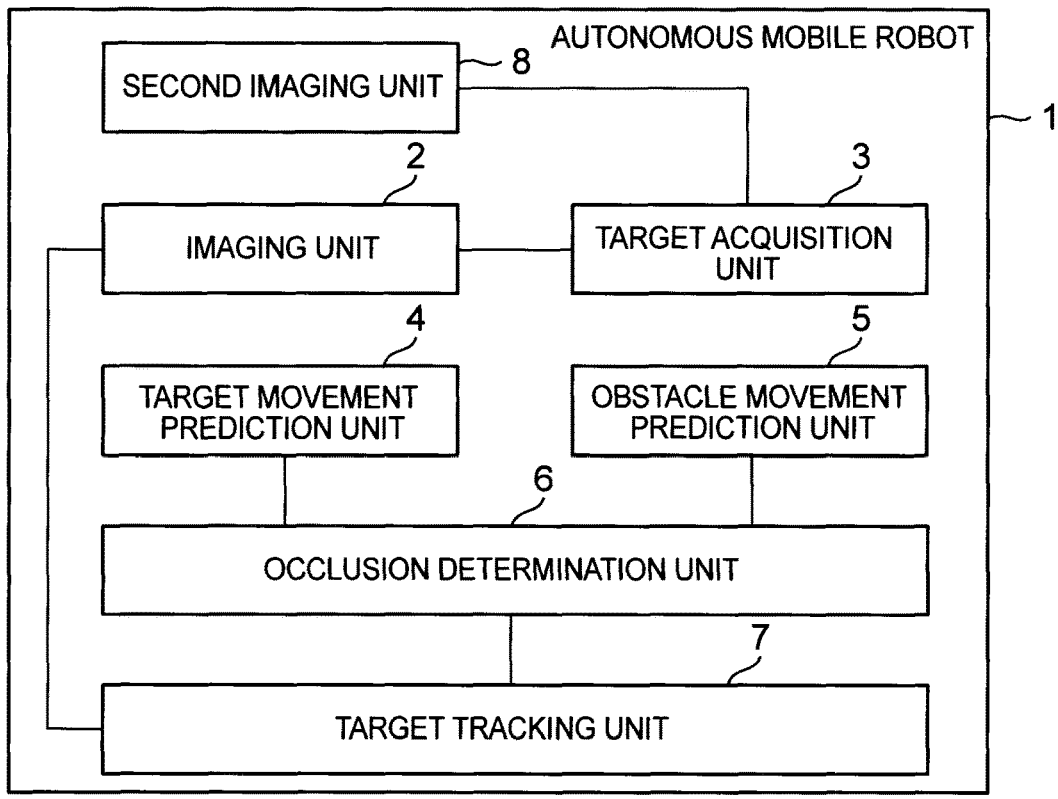
FIG. 11 It depicts a block diagram illustrating the main part of another autonomous mobile robot.

FIG. 11 is a block diagram illustrating the main part of an autonomous mobile robot of another mode. The autonomous mobile robot 1 illustrated in FIG. 11 is configured to include a second imaging unit 8 (for example, the omnidirectional cameras 15 and 16) having a wider field of view than the field of view of the imaging unit so as to acquire a target by using an image obtained by the second imaging unit 8 in the case where the target acquisition unit 3 loses sight of the target.

Figure 12:
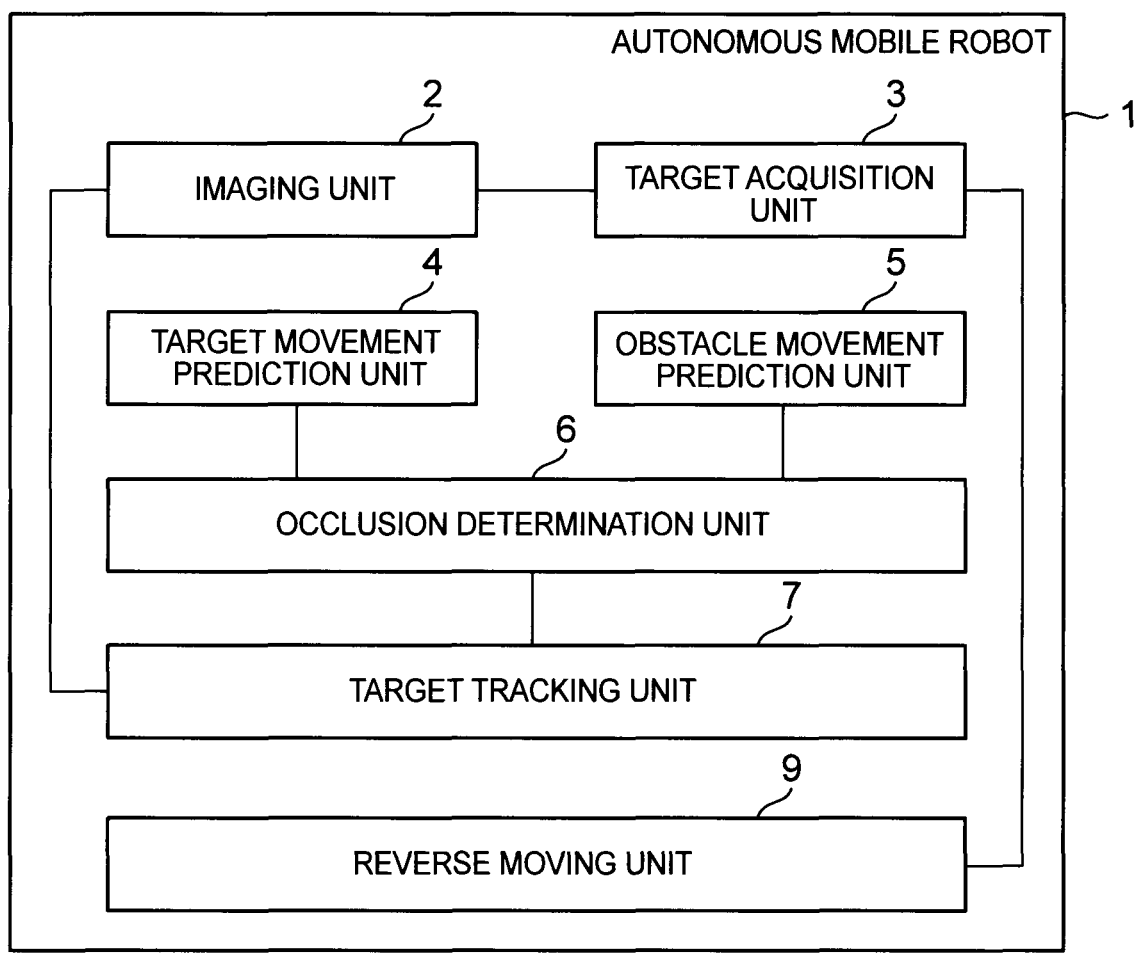
FIG. 12 It depicts a block diagram illustrating the main part of further another autonomous mobile robot.

FIG. 12 is a block diagram illustrating the main part of an autonomous mobile robot of further another mode. The autonomous mobile robot 1 illustrated in FIG. 12 is configured to include a reverse moving unit 9 (implemented by the movement control unit 18 in the exemplary embodiment) that moves the autonomous mobile robot in the reverse direction to the moving direction of the obstacle when the target acquisition unit 3 loses sight of the target.

What is claimed is:

1. An autonomous mobile robot comprising:
    a target acquisition unit implemented at least by a hardware including a processor and which identifies a target by using an image obtained by an imaging unit whose field of view is able to be changed;
    a target movement prediction unit implemented at least by the hardware and which predicts a position of the target after moving on the basis of a past position and moving speed of the target;
    an obstacle movement prediction unit implemented at least by the hardware and which predicts a position of an obstacle after moving on the basis of a past position and moving speed of the obstacle;
    an occlusion determination unit on the basis of a past position and moving speed of the obstacle which determines whether or not the target is occluded by the obstacle by determining whether or not the obstacle at the predicted position of the obstacle after moving overlaps the target at the predicted position of the target after moving; and
    a target tracking unit implemented at least by the hardware and which changes the field of view of the imaging unit so that a larger area of the target coming into the field of view when it is determined that at least a part of the target is occluded by the obstacle.

2. The autonomous mobile robot according to claim 1, wherein:
    the target movement prediction unit predicts a moving direction of the target; and
    the target tracking unit includes a first determination unit which determines whether or not a likelihood that the target is occluded by the obstacle decreases when the autonomous mobile robot moves in the moving direction of the target and a moving unit which moves the autonomous mobile robot in a moving direction of the target when the first determination unit determines that the likelihood decreases.

3. The autonomous mobile robot according to claim 2, wherein:
    the obstacle movement prediction unit predicts a moving direction of the obstacle; and
    the target tracking unit includes a second determination unit which determines whether or not the occlusion of the target by the obstacle is avoided in case where the obstacle moves in the predicted moving direction of the obstacle and the autonomous mobile robot waits for the obstacle to pass, and a stopping unit which stops the autonomous mobile robot when the second determination unit determines that the occlusion of the target is avoided.

4. The autonomous mobile robot according to claim 1, further comprising a second imaging unit which has a wider angle of view than an angle of view of the imaging unit and obtains an image with the target in it,
    wherein the target acquisition unit acquires the target by using an image of the second imaging unit when the target is occluded by the obstacle.

5. The autonomous mobile robot according to claim 2, further comprising a second imaging unit which has a wider angle of view than an angle of view of the imaging unit and obtains an image with the target in it,
    wherein the target acquisition unit acquires the target by using the image by the second imaging unit when the target is occluded by the obstacle.

6. The autonomous mobile robot according to claim 3, further comprising a second imaging unit implemented at least by the hardware and which has a wider angle of view than an angle of view of the imaging unit and obtains an image with the target in it,
    wherein the target acquisition unit acquires the target by using an image of the second imaging unit when the target is occluded by the obstacle.

7. The autonomous mobile robot according to claim 1, further comprising a reverse moving unit implemented at least by the hardware and which moves the autonomous mobile robot in a reverse direction to the moving direction of the obstacle when the target is occluded by the obstacle.

8. The autonomous mobile robot according to claim 2, further comprising a reverse moving unit implemented at least by the hardware and which moves the autonomous mobile robot in a reverse direction to the moving direction of the obstacle when the target is occluded by the obstacle.

9. The autonomous mobile robot according to claim 3, further comprising a reverse moving unit implemented at least by the hardware and which moves the autonomous mobile robot in a reverse direction to the moving direction of the obstacle when the target is occluded by the obstacle.

10. A computer-implemented autonomous mobile robot control method comprising:
    identifying a target of an autonomous mobile robot by using an image obtained by an imaging unit whose field of view is able to be changed;
    predicting a position of the target after moving on the basis of a past position and moving speed of the target;
    predicting a position of an obstacle after moving on the basis of a past position and moving speed of the obstacle;
    determining whether or not the target is occluded by the obstacle by determining whether or not the obstacle at the predicted position of the obstacle after moving overlaps the target at the predicted position of the target after moving; and
    changing the field of view of the imaging unit so that a larger area of the whole target comes into the field of view when it is determined that at least a part of the target is occluded by the obstacle.

11. The computer-implemented autonomous mobile robot control method according to claim 10, further comprising:
predicting a moving direction of the target;
determining whether or not likelihood that the target is occluded by the obstacle decreases when the autonomous mobile robot moves in a moving direction of the target; and
moving the autonomous mobile robot in the moving direction of the target when it is determined that the likelihood decreases.

12. The computer-implemented autonomous mobile robot control method according to claim 10, further comprising:
predicting a moving direction of the obstacle;
determining whether or not the occlusion of the target by the obstacle is avoided in case where the obstacle moves in the predicted moving direction of the obstacle and the autonomous mobile robot waits for the obstacle to pass; and
stopping the autonomous mobile robot when it is determined that the occlusion of the target is avoided.

13. The computer-implemented autonomous mobile robot control method according to claim 11, further comprising:
predicting a moving direction of the obstacle;
determining whether or not the occlusion of the target by the obstacle is avoided in case where the obstacle moves in the predicted moving direction of the obstacle and the autonomous mobile robot waits for the obstacle to pass; and
stopping the autonomous mobile robot when it is determined that the occlusion of the target is avoided.

14. The computer-implemented autonomous mobile robot control method according to claim 10, wherein the target is acquired by using an image by a second imaging unit having a wider angle of view than an angle of view of the imaging unit and obtains an image with the target in it, when the target is occluded by the obstacle.

15. The computer-implemented autonomous mobile robot control method according to claim 11, wherein the target is acquired by using an image by a second imaging unit having a wider angle of view than an angle of view of the imaging unit and obtains an image with the target in it, when the target is occluded by the obstacle.

16. The computer-implemented autonomous mobile robot control method according to claim 12, wherein the target is acquired by using an image by the a second imaging unit having a wider angle of view than an angle of view of the imaging unit and obtains an image with the target in it, when the target is occluded by the obstacle.

17. The computer-implemented autonomous mobile robot control method according to claim 13, wherein the target is acquired by using an image by a second imaging unit having a wider angle of view than an angle of view of the imaging unit and obtains an image with the target in it, when the target is occluded by the obstacle.

18. A non-transitory computer-readable recording medium for storing an autonomous mobile robot control program, the autonomous mobile robot control program causing a processor to perform:
identifying a target of an autonomous mobile robot by using an image obtained by an imaging unit whose field of view is able to be changed;
predicting a position of the target after moving on the basis of a past position and moving speed of the target;
predicting a position of an obstacle after moving on the basis of a past position and moving speed of the obstacle;
determining whether or not the target is occluded by the obstacle by determining whether or not the obstacle at the predicted position of the obstacle after moving overlaps the target at the predicted position of the target after moving; and
changing the field of view of the imaging unit so that a larger area of the whole target comes into the field of view when it is determined that at least a part of the target is occluded by the obstacle.

* * * * *